United States Patent [19]

Sasazawa et al.

[11] 4,066,564
[45] Jan. 3, 1978

[54] PROCESS FOR PRODUCING COBALT- AND IRON-CONTAINING FERROMAGNETIC POWDER BY HEAT-TREATMENT IN THE PRESENCE OF AN OXIDIZING AGENT

[75] Inventors: Koji Sasazawa; Shin-Ichiro Dezawa; Tatsuji Kitamoto, all of Odawara, Japan

[73] Assignee: Fuji Photo Film Co., Ltd., Minami-ashigara, Japan

[21] Appl. No.: 702,171

[22] Filed: July 2, 1976

[30] Foreign Application Priority Data

July 2, 1975 Japan ................................. 50-82077

[51] Int. Cl.$^2$ ....................... C01G 49/06; C01G 49/08
[52] U.S. Cl. .................. 252/62.56; 427/127; 427/128; 427/130
[58] Field of Search .......................... 252/62.55, 62.56; 423/633, 634; 427/127, 128, 130

[56] References Cited

U.S. PATENT DOCUMENTS

| 3,075,919 | 1/1963 | Gruber et al. | 252/62.56 |
| 3,243,375 | 3/1966 | Jeschke | 252/62.56 |

FOREIGN PATENT DOCUMENTS

| 2,413,430 | 10/1974 | Germany | 252/62.56 |
| 2,036,612 | 2/1971 | Germany | 252/62.56 |
| 2,235,383 | 2/1973 | Germany | 252/62.56 |
| 40-22055 | 9/1965 | Japan | 252/62.56 |

OTHER PUBLICATIONS

Umeki, "Chem. Abstracts," vol. 82, 1975, 79751v.

Primary Examiner—Jack Cooper
Attorney, Agent, or Firm—Sughrue, Rothwell, Mion, Zinn & Macpeak

[57] ABSTRACT

A Co- and Fe-containing ferromagnetic iron oxide powder having a high coercive force and improved stability to heat and pressure is produced by adding an aqueous alkali solution, an aqueous solution containing $Co^{+2}$ ions, and an aqueous solution containing not more than 1 equivalent, based on the $Co^{+2}$ ions, of Fe ions to a suspension of ferromagnetic iron oxide, and heating the mixture at a temperature of at least 80° C in the presence of an oxidizing agent. The ferromagnetic iron oxide powder is especially suitable for producing magnetic recording media.

21 Claims, 1 Drawing Figure

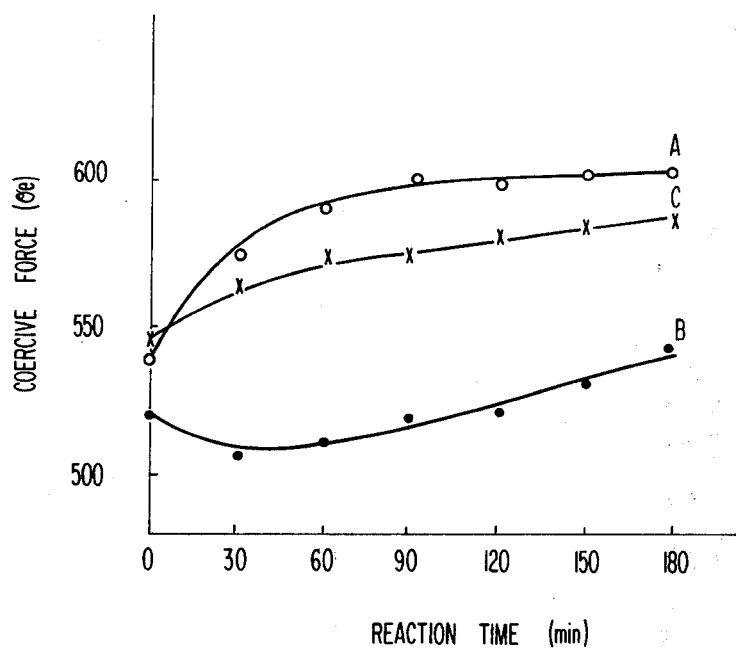

PROCESS FOR PRODUCING COBALT- AND IRON-CONTAINING FERROMAGNETIC POWDER BY HEAT-TREATMENT IN THE PRESENCE OF AN OXIDIZING AGENT

BACKGROUND OF THE INVENTION

1. Field of the Invention

This invention relates to ferromagnetic iron oxide powder for magnetic recording, specifically, to ferromagnetic iron oxide powder having a high coercive force and improved stability to pressure and heat.

2. Description of the Prior Art

Ferromagnetic iron oxide for magnetic recording are required to have a high coercive force and exhibit superior orientability.

One effective means of increasing the coercive force of ferromagnetic iron oxide powder involves incorporating cobalt ions in the iron oxide to form a solid solution, and various methods of this type are suggested, for example, in U.S. Pat. Nos. 3,117,933 and 3,671,435, Japanese Patent Application (Laid-Open) 101599/73, and Japanese Patent Publications 6538/66, 4264/74, 27719/66 (corresponding to U.S. Pat. Nos. 3,573,980), 15759/73 10994/73 and 6113/67. Magnetic recording media, such as magnetic tapes, made using the cobalt-containing iron oxides produced by such methods, however, have the defect that they are unstable to pressure and heat, and the magnetic signals recorded become weak or are transferred to a great extent.

Other methods for increasing coercive force comprise adhering a layer of a cobalt compound or cobalt ferrite to the surface of magnetic iron oxide powder free of cobalt in the form of a solid solution, or growing such a layer on the surface thereof. Such methods are specifically disclosed, for example, in Japanese Patent Applications (Laid-Open) 108599/74, 37667/75 and 37668/75 and Japanese Patent Publication 49475/74. Ferromagnetic iron oxide powders obtained by these methods are stable to pressure and heat and have improved print through characteristic as compared with those obtained by forming an iron oxide-cobalt solid solution per se.

The methods which comprise adhering a cobalt compound to the surface of a ferromagnetic iron oxide not containing cobalt can afford a product having a coercive force of about 500 to 600 Oe at the highest. On the other hand, by methods involving growing a cobalt ferrite layer, the coercive force of the resulting product is nearly proportional to the volume of the cobalt ferrite layer grown on the surface. The cobalt ferrite layer is a magnetic oxide layer in which cobalt is dissolved to form a solid solution, and is unstable to pressure and heat. This defect of the cobalt ferrite layer grown on the surface gradually shows itself, and this method, as a result cannot provide ferromagnetic iron oxide powder having a high coercive force and improved stability to pressure and heat.

SUMMARY OF THE INVENTION

It is one object of this invention to provide a ferromagnetic iron oxide powder for magnetic recording having a high coercive force, improved stability to pressure and heat and improved print through characteristics by adhering a cobalt-containing layer onto the surface of an acicular magnetic iron oxide free from cobalt. In the present specification and claims, the term "not containing cobalt" means that if cobalt is present as an impurity it is present in an amount of at most about 0.25 atomic %, and it is most preferred that cobalt not be present even as an impurity. In any case, the amount of cobalt present must be so low that no effects due to cobalt appear.

In particular, this invention relates to an improvement in processes for increasing the coercive force of ferromagnetic iron oxide powder by precipitating a cobalt-containing compound in solution as disclosed, for example, in Japanese Patent Applications (Laid-Open) 108599/74, 37667/75 and 37668/75, which are similar to methods of precipitating ferric onto acicular particles as disclosed in Japanese Patent Publications 5515/61 and 4825/62.

According to this invention, there is provided a process for producing Co- and Fe-containing ferromagnetic powder which comprises adding an aqueous alkali solution and an aqueous solution containing $CO^{+2}$ ions to a suspension of ferromagnetic iron oxide and heating the mixture, wherein not more than 1 equivalent, based on $Co^{+2}$ ions, of Fe ions is added to the suspension, and the heating is carried out at a temperature of at least about 80° C in the presence of an oxidizing agent.

BRIEF DESCRIPTION OF THE DRAWINGS

The drawing is a graphical presentation of results achieved in the Examples, showing the relationship between coercive force (oersteds) and the reaction time (minutes) for certain samples prepared in the Examples.

DETAILED DESCRIPTION OF THE INVENTION

We have extensively investigated methods of adhering or growing a cobalt compound layer on the surface of acicular iron oxide powder not containing cobalt, and found that by adhering a layer containing cobalt and not more than 1 equivalent, based on the cobalt, of Fe ions onto the surface of acicular iron oxide in the presence of an oxidizing agent, a magnetic powder having a higher coercive force than in the case of adhering or growing only a cobalt compound layer or a cobalt ferrite layer can be obtained.

The details of the mechanism thereof are not yet completely clear, but it is believed that by adding an oxidizing agent in the presence of $Co^{+2}$ ions and Fe ions, oxidation of the Fe ions and a partial oxidation of the $Co^{+2}$ ions exert occur and some influences on the arrangement of the Co ions, and strengthen the interaction of Co ions with Fe ions in the ferromagnetic iron oxide.

In order to increase the coercive force, the amount of cobalt is required to be at least about 0.5 atomic percent based on the total amount of iron which constitutes the acicular magnetic iron oxide as a nucleus. Usually, cobalt in an amount of more than 10 atomic percent contributes little to the increase of the coercive force and, for economic reasons, such will not generally be used, though it is possible to use such greater amounts if one wishes. The effective amount of Fe ion is at least about 0.1 equivalent based on the amount of cobalt. Amounts of more than 1 equivalent, however, result in the formation of a ferromagnetic cobalt ferrite layer at the time of forming a cobalt layer.

The acicular magnetic iron oxide used as a nucleus is preferably one which has a high coercive force by shape anisotropy and superior dipersibility and orientability. The use of such acicular magnetic iron oxide insures that the shape of the starting particles is maintained even after adhering a Co — Fe ion layer to the surface, and the particles have good dispersibility and orientability. The high coercive force of the starting powder makes it possible to use only a small amount of cobalt in order to obtain the desired coercive force, and this is commercially advantageous.

The ferromagnetic iron oxide used in this invention includes, for example, maghemite ($\gamma$-$Fe_2O_3$), magnetite ($Fe_3O_4$), Berthollide iron oxides (iron oxides having a degree of oxidation intermediate maghemite and magnetite; $FeO_x$ in which $1.33 < x < 1.50$), and partly oxidized metallic iron, most preferably where the average composition is such that, if the iron is represented by the formula $FeO_x$, $x$ is greater than about 0.5. These iron oxides have an acicular ratio of about 2/1 to about 20/1, preferably 4/1 to 12/1, and an average particle length of about 0.3 about 1.5 $\mu$m, preferably 0.4 to 1 m. Of these, maghemite and magnetite usually have a coercive force (Hc) of about 250 to 450 Oe. The Berthollide iron oxide obtained by oxidizing or reducing maghemite and magnetite is approximately $FeO_{1.35}$ and has a coercive force about 30 Oe higher than maghemite and magnetite.

The above described iron oxides wherein $x$ is $1.33 < x < 1.50$ are peferably used in this invention. The amount of the ferromagnetic iron oxide present in the reaction system is not overly important, and exemplary portions are given in the Examples.

The aqueous solution containing $Co^{+2}$ irons is an aqueous solution having dissolved therein a water-soluble cobalt salt and/or an aqueous solution containing divalent cobalt hydroxide. It is reacted with the ferromagnetic iron oxide together with the Fe ions.

The water-soluble cobalt salts are compounds which yield $Co^{+2}$ ions in water, and include, for example, inorganic salts, inorganic acid salts, organic acid salts, and complex salts of cobalt. These water soluble cobalt salts most preferably exhibit a water solubility of greater than 2 g/100 ml of water at 25° C.

Specific examples of such cobalt salts are cobalt inorganic acid salts such as cobalt sulfate, cobalt nitrate, cobalt perchlorate, cobalt fluorosilicate, cobalt ammonium sulfate, and cobalt ammonium chloride; cobalt organic acid salts such as cobalt acetate, cobalt citrate, cobalt tartrate, and cobalt formate; cobalt halides such as cobalt chloride, cobalt bromide, cobalt fluoride, and cobalt iodide; and cobalt complex salts such as hexammine cobalt chloride, hexammine cobalt nitrate, ethylendiamine cobalt chloride, and cesium hexafluorocobalt.

Of these, the chlorides, sulfates, nitrates, bromides, fluorides, iodides, perchlorates, acetates, benzoates, hexammine chlorides, hexammine nitrates, hexammine sulfates, aquopentammine chlorides, ethylenediamine chlorides, and ammonium sulfates of cobalt are especially suitable.

The amount of the water-soluble cobalt salt added is about 0.5 to about 10 atomic percent, preferably 0.8 to 5 atomic percent, based on the iron present in the ferromagnetic iron oxide. The cobalt is substantially stoichiometrically incorporated into the iron in the final product.

Water-soluble iron salts are compounds which yield $Fe^{+2}$ or $Fe^{+3}$ ions in water; they preferably have a solubility in water greater than 2 at 25° C and include, for example, ferrous chloride, ferrous perchlorate, ferrous bromide, ferrous nitrate, ferrous iodide, ferrous sulfate, and ferrous ammonium sulfate (the above compounds yields $Fe^{+2}$ ions), and ferric chloride, ferric perchlorate, ferric bromide, ferric nitrate, ferric iodide, ferric sulfate, and ferric ammonium sulfate (the above compounds yield $Fe^{+3}$ ions).

Examples of the alkali used in this invention are alkali hydroxides such as sodium hydroxide, potassium hydroxide or lighium hydroxide, alkali carbonates such as sodium carbonate or potassium carbonate, ammonia water aliphatic or aromatic amines such as monoethanolamine or p-phenylenediamine, and mixtures thereof. These alkaline substances are used as a solution in water.

The total amount of the alkali is such that after it has neutralized the $Co^{+2}$ ion and Fe ion, the $[OH^-]$ concentration of the slurry is at least 0.5 mole/liter. Generally, the amount of alkali is within the range of from about 1.0 to about 3.0 N/liter.

The reaction temperature should be at least about 80° C. If either or both of the reaction temperature and the $OH^-$ concentration are below the specified ranges, it is difficult to obtain a magnetic powder having a high coercive force, and therefore, such conditions are commercially unacceptable.

The oxidizing agent used in this invention can be freely selected from gaseous, liquid and solid compounds which are soluble in the reaction solution described above. When the oxidizing agent is a solid, it is preferably added as an aqueous solution thereof. The oxidizing agents utilized in the present invention most preferably illustrate a standard electrode potential (at 25° C) of greater than about $-0.076$ V (i.e., positive or 0 to about $-0.076$ V).

Specific examples of oxidizing agents include air, oxygen, hydrogen peroxide, nitrate ions, nitrite ions, chlorate ions, perchlorate ions, permanganate ions and chromate ion. These ions are provided by dissolving inorganic acids, anhydride acids, ammonium salts, metal salts such as alkali metals, alkaline earth metals and other metals which can be dissolved in water. The important characteristic which these materials must exhibit, of course, is that they are capable of dissolution in water.

Nitrate ions are provided by compounds such as nitric acid, ammonium nitrate, lithium nitrate, sodium nitrate, postassium nitrate, beryllium nitrate, magnesium nitrate, calcium nitrate, strontium nitrate, barium nitrate, aluminum nitrate, chromium nitrate, manganese nitrate, iron nitrate, cobalt nitrate, nickel nitrate, copper nitrate, zinc nitrate, silver nitrate, cadmium nitrate, tin nitrate, mercury nitrate, and zinc nitrate.

Nitrate ions are provided by compounds such as ammonium nitrite, sodium nitrite, potassium nitrite, barium nitrite, and silver nitrite.

Chlorite ions are provided by compounds such as chloric acid, ammonium chlorate, calcium chlorate, barium chlorate, silver chlorate, and lead chlorate.

Perchlorate ions are provided by compounds such as perchloric acid, ammonium perchlorate, lithium perchlorate, sodium perchlorate, magnesium perchlorate, calcium perchlorate, strontium perchlorate, barium perchlorate, manganese perchlorate, iron perchlorate, cobalt perchlorate, nickel perchlorate, silver perchlorate, and lead perchlorate.

Permanganate ions are provided by compounds such as ammonium permanganate, sodium permanganate, potassium permanganate, calcium permanganate, and barium permanganate.

Chromate ions are provided by compounds such as chromic anhydride, ammonium chromate, ammonium bichromate, lithium chromate, sodium chromate, potassium chromate, barium chromate, silver chromate, silver bichromate, mercury chromate, and lead chromate.

The above oxidizing agent, when a gas, e.g., air or oxygen, is added in an amount of at least about 0.1 liter/min., preferably 0.1 to 10 liter/min., per liter of the reaction solution. A liquid or solid oxidizing agent is added in an amount of at least about 0.1 equivalents, preferably 0.1 to 5 equivalents, more preferably 0.5 to 2 equivalents, based on the $Co^{+2}$ ion in the reaction solution.

The use of the oxidizing agent in excessive amounts gives substantially the same results. It is considered that the effect in accordance with this invention increases as a result of oxidizing a part of the $Co^{+2}$ ions and/or other cations.

The process for producing ferromagnetic iron oxide powders in accordance with this invention is described in greater detail below.

First, particles of ferromagnetic iron oxide, such as maghemite particles, magnetite particles, or Berthollide iron oxide particles, are dispersed in water. While the resulting suspension is being continuously stirred, one of the following four steps is performed.

A. Add an aqueous solution containing $Co^{+2}$ ions, then an aqueous alkali solution, and finally an aqueous solution containing Fe ions.

B. Add an aqueous alkali solution, then an aqueous solution containing $Co^{+2}$ ions, and finally an aqueous solution containing Fe ions.

C. In step (B), the aqueous alkali solution is divided into two portions, and one portion is added after the addition of the Fe ion solution (portion-wise addition).

D. The aqueous alkali solution the aqueous solution containing $Co^{+2}$ ions, and the aqueous solution containing Fe ions are each divided into at least two portions, and step (C) is repeated. Finally, the aqueous alkali solution is added (repeated portion-wise addition).

In any of the steps (A) to (D), cobalt hydroxide can be used instead of the aqueous solution containing $Co^{+2}$ ions, the cobalt hydroxide solution being of a strength so as to provide essentially the same amount of $Co^{+2}$ ions as the aqueous solution containing $Co^{+2}$ ions earlier discussed.

Preferably, the suspension is continuously stirred even when performing the steps (A) to (D). Stirring is performed by conventional means e.g., a stirrer, ultrasonic oscillations or the like.

In the process of this invention, the oxidizing agent can be added at any point from the preparation of the suspension of the starting material to the heating treatment step to be described below. Preferably, however, it is added after the end of the step (A), (B), (C) or (D) and before the heating step. It is more preferred to add the oxidixing agent before the temperature of the system reaches the reaction temperature, and the most preferred time of addition is after adding the cations ($Co^{+2}$ ions and other cations, if present) and alkali solutions and before the temperature of the system reaches the reaction temperature.

It is generally most convenient to divide the alkali solution and the $Co^{+2}$ and/or other cation solution into equal portions for each portion-wise addition for the particular solution involved, though, of course, this is not mandatory. Often, when the alkali solution is initially added, the amount used will be 0.7 to 1 time that required to neutralize the $Co^{+2}$ and other cations.

The resulting alkali solution slurry (containing $Co^{+2}$ ions and Fe ions) of iron oxide is continuously stirred and reacted at a temperature of at least 80° C.

After adding these solutions, they must be homogenized in the suspension of the ferromagnetic powder by thorough stirring. Usually, the stirring is performed for 30 to 60 minutes.

By carrying out precipitation in multiple stages as in the methods (C) and (D), uniform precipitation of the Co or other metals can be effected. This serves to increase the coercive force of the ferromagnetic powder and to narrow the coercive force distribution in accordance with this invention. Stirring is carried out by conventional means, for example, a stirrer, ultrasonic vibrations, etc.

As stated above, the time of adding the oxidizing agent is not limited, but it is preferably added after introducing the cation(s) and alkali(es) by any of the methods (A), (B), (C) and (D). It is more preferred to add the oxidizing agent before the temperature of the system reaches the reaction temperature, and the most preferred time of addition is after adding the cations ($Co^{+2}$ ions and other cations, if present) and alkali solutions and before the temperature of the system reaches the reaction temperature.

For convenience of operation, the suspension of the ferromagnetic powder is advantageously heated after all of the reaction solutions have been added, but it may be heated from the outset. The heating temperature is desirably about 80° to about 150° C, and, most desirably, the reaction is carried out in the boiling state at 90° to 105° C.

If the temperature is lower than 80° C, long periods of time are required to increase the coercive force of the ferromagnetic powder, which is commercially disadvantageous. If it is above 105° C, no merits are obtained in performing the reaction in a reactor at atmospheric pressure. It is of course, possible however, to heat the suspension of the ferromagnetic powder at a temperature of as high as about 150° C using an autoclave. Pressure is not overly important in the present invention, but, of course, if the heating temperature is over 105° C, a pressure over one atmosphere is necessary.

Generally, heating will be conducted for more than about 30 minutes.

In order to remove excess alkali in the reaction mixture after reaction, it is washed with water until its pH becomes not more than about 9.5, preferably not more than 8.5. It is then dehydrated by, for example, filtration or centrifugal separation. The residue is then dried at a temperature of about 40 to 200° C. The drying time is not important, and can be freely selected so as to obtain the desired degree of drying.

The above process steps are applicable when the starting ferromagnetic iron oxide is maghemite ($\gamma$-$Fe_2O_3$). In the case of magnetite ($Fe_3O_4$) or Berthollide iron oxide, the final drying step must be carried out in an inert gas such as $N_2$ or an inert gas such as He, Ne, Ar. This is because magnetite and Berthollide iron oxide are likely to be oxidized by heat when heat dried in the air.

The above process steps thus afford ferromagnetic iron oxide powder containing Co. If desired, other metals such as Cr, Mn, Fe, Ni and Zn can be present with the Co by adding water-soluble compounds of such a metal or metals to the reaction system. Generally, such secondary elements will be present in an amount no greater than about ⅔ the amount of the Co which is present, in which case the total amount of the Co and such one or more other metals is still about 0.5 to about 10 atomic %, based on the iron present in the ferromagnetic iron oxide nucleus.

Where the resulting ferromagnetic iron oxide is magnetite or Berthollide iron oxide, its degree of oxidation can be adjusted by further treating it in an oxiding atmosphere, for example, as disclosed in Japanese Patent Publications 5009/64 and 10307/64.

The effect obtainable by the present invention is that ferromagnetic iron oxide containing Co(or both Co and one or more other metals) having a high coercive force can be obtained by using an oxidizing agent when heating the above-described reaction solution. According to the invention, Co and other metals can be uniformly incorporated, and ferromagnetic iron oxide of superior stability can be obtained.

In the process of this invention described hereinabove, heating at about 200° to 500° C. carried out in conventional processes after drying (disclosed, for example, in Japanese Patent Publication 27719/72, Japanese Patent Application (Laid-Open) 119196/74, and U.S. Pat. No. 3,725,126) is not required to obtain ferromagnetic iron oxides having a high coercive force. However, the coercive force thereof can be even further increased by performing such a heating.

The ferromagnetic iron oxide obtained by the process of this invention can be used in various applications. Especially when it is used for magnetic recording, products having good characteristics are obtained.

A ferromagnetic powder of this invention obtained in the above manner can for example, be dispersed in a binder, which is coated using an organic solvent on a base (support) and dried to form a magnetic layer for use as a magnetic recording medium.

The methods of preparing magnetic coating composition used in this invention are described in detail, e.g., in Japanese Patent Publications 186/68, 28,043/72, 28,045/72, 28,046/72, 28,048/72 and 31,445/72, and U.S. Pat. No. 3,943,012. The magnetic coating compositions described in the above specifications contain as main components a ferromagnetic powder, a binder and a solvent for coating, and optionally, contain additives such as a dispersing agent, a lubricant, an abrasive and an antistatic agent.

Hitherto known thermoplastic resins, thermosetting resins, or mixtures thereof, can be used as binders for the ferromagnetic metal powder of the present invention.

Suitable thermoplastic resins are those resins which have a softening point of about 150° C or less, an average molecular weight of about 10,000 to 200,000, and a degree of polymerization on the order of about 200 to 2,000 e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins such as neoprene rubber, isoprene rubber, styrene-butadiene rubber, etc., and mixtures thereof.

Suitable examples of these resins which can be used are described in Japanese Patent Publications 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22062/1972, 22064/1972, 22068/1972, 22069/1972, 22070/1972, 27886/1973, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid copolymer and a diisocyanate prepolymer, a mixture of a polyester-polyl and a polyisocyanate, a urea-formaldehyde resin, a mixture of a low molecular weight glycol, a high molecular weight diol and triphenylmethane triisocyanate, a polyamine resin, and mixtures thereof, etc.

Suitable examples of these resins which can be used are described in Japanese Patent Publications 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the fine ferromagnetic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

The magnetic recording layer may contain, in addition to the afore-said binder and the ferromagnetic powders, additives such as a dispersing agent, a lubricant, an abrasive and an antistatic agent.

The dispersing agents used include aliphatic acids having 12 to 18 carbon atoms ($R_1$COOH wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, carbon black, graphite, a carbon black-grafted polymer, molybdenum disulfide, tungsten disulfide, aliphatic esters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (the carbon atoms of the monobasic aliphatic acid and the carbon atoms of the monohydric alcohol total 21 to 23), etc. These lubricants are added in an amount of 0.2 to 20 parts by weight per 100 parts by weight of the binder. These lubricants are described, e.g., in Japanese Patent Publications 23,889/68, Japanese Patent Applications 28,647/67 and 81,543/68, U.S. Patents 3,470,021, 3,492,235, 3,497,411, 3,523,086, 3,625,760, 3,630,772, 3,634,253, 3,642,539 and 3,687,725, "IBM Technical Disclosure Bulletin," vol. 9, No. 7 page 779 (Dec. 1966), "ELECTRONIK" No. 12, page 380 (1961), etc.

The abrasives used include those which are generally used, such as fused alumina, silicon carbide, chromium oxide, corundum, artificial corundum, diamond, artificial diamond, garnet and emery (main components: corundum and magnetitie). The average particle diameter of these abrasives is 0.05 to 5 $\mu$, preferably 0.1 to 2 $\mu$. These abrasives are added in an amount of 7 to 20 parts by weight per 100 parts by weight of the binder. These abrasives are described in Japanese Patent Application 26,749/73, U.S. Pat. Nos. 3,007,807, 3,041,196, 3,293,066, 3,630,910 and 3,687,725, British Patent 1,145,349, and West German Patent 853,211.

Examples of the antistatic agent are electrically conductive powders such as graphite or carbon black. The amount of the antistatic agent, when used, is about 5 parts by weight per 100 parts by weight of the ferromagnetic powder.

These antistatic agents are described, for example, in Japanese Patent Publications 2613/65, 24881/72, 15440/73, and 3642/75, U.S. Pat. Nos 2,804,401, 3,293,066, and 3,647,539, British Patent 793,520, and "IBM Technical Disclosure Bulletin," Vol. 6, No. 12, page 4 (May 1964).

In order to disperse the ferromagnetic powder into the binder, conventional methods are utilized. For example, ball milling, vibratory milling, sand milling, colloid milling and combinations thereof these can be used. In some cases, ultrasonic vibration can be jointly used therewith. Various types of kneaders can be used in performing the dispersion. Examples include a two-roll mill, a three-roll mill, a ball mill, a pebble mill, a trommel, a sand grainder, a Szegvari attritor, a high-speed impeller, a high-speed stone mill, a high-speed impact mill, a disperser, a kneader, an high-speed mixer, a homogenizer, and an ultrasonic dispersing apparatus.

Various useful techniques relating to kneading and dispersing are described in T. C. Patton, "Paint Flow and Pigment Dispersion," 1964, John Wiley & Sons, and in U.S. Pat. Nos. 2,581,414 and 2,855,156.

Magnetic recording layers are formed by dissolving the above components in an organic solvent to make a coating composition and then coating the same on a support.

The thickness of the support used is conventional and is about 5 to 50 $\mu$m, preferably about 10 to 40 $\mu$m. The materials used for the support include polyesters such as polyethylene terephthalate and polyethelene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer. Descriptions of back coats are found, e.g., in U.S. Pat. Nos. 2,804,410, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688, etc.

The supports may be in any shape such as a tape, sheet, card, disc or drum, and various materials can be used depending upon the shape desired and end use contemplated.

The afore-said magnetic recording layer can be coated on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used. The details of these methods are described in "Coating Engineering," pp. 253 to 277, Asakura Publisher Mar. 20, 1971).

The organic solvents which can be used for coating include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene; and the like.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960 and 3,681,138; Japanese Patent Publications 3427/1957, 28368/1964, 23624/1965, 23625/1965, 13181/1966, 13042/1973 and 39722/1973. If required, the magnetic layer can be subjected to a surface smoothening treatment, or cut to the desired shape, to thereby form the magnetic recording material of this invention. Suitable surface smoothening techniques are disclosed in U.S. Pat. Nos. 2,688,567, 2,998,325 and 3,783,023, and German Patent Application (OPI) No. 2,405,222.

In the above orienting treatment for the magnetic layer, the orienting magnetic field can be either an AC or DC magnetic field with a field strength of about 500 to 2,000 gauss. The drying temperature can range from about 50° to about 100° C, and the drying time is about 3 to 10 minutes.

In the surface smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above 120 meters/min., operation is difficult.

The most preferred process for the production of a magnetic recording medium disclosed above is the process disclosed in Japanese Patent Application (OPI) 41506/1975 (corresponding to U.S. patent application Ser. No. 498,337, filed on Aug. 19, 1974).

The following Examples and Comparative Examples illustrate the present invention more specifically. In the Examples, all processings were at room temperature and at atmospheric pressure, unless otherwise indicated.

EXAMPLE 1

400 g of Berthollide iron oxide ($FeO_x$ in which $x=1.4$; $Fe^+/Fe^+=0.25$; average particle length 0.5 μm; acicular ratio 8/1; coercive force Hc 420 Oe) was dispersed in 4 liters of an aqueous solution of sodium hydroxide (1 mole/liter).

Then, 40 g of cobalt sulfate ($CoSO_4 \cdot 7H_2O$) and 20 g of ferrous sulfate were dissolved in 500 ml of water, and the resulting aqueous solution was added to the dispersion. In this regard, it is to be specifically noted that the time of addition is not important. In this Example, about 1 minute was used for the addition. No difference was encountered when the time of addition was changed to, for example, 10 minutes. Hereafter, the same time was used in the following examples unless otherwise indicated. A solution of 10 g of ammonium nitrate ($NH_4NO_3$) as an oxidizing agent in 200 ml of water was added. The mixture was then heated to 95° C, and maintained at this temperature for 3 hours. In this regard, the temperature elevation rate is not important. It took 15 minutes in this example. No difference was encountered if lesser or greater times were used, for example over 10 minutes to 2 hours. Hereafter, the same temperature elevation rate was used in the following examples, unless otherwise indicated.

After the temperature of the mixture reached 95° C as described above, a part of the reaction mixture was collected every 30 min. (i.e., sample collection was performed seven times). The seven magnetic iron oxide samples were filtered, washed with water, and dried at 60° C for about 10 hours. The time of drying is not important. Hereafter the same time was used in the following examples, unless otherwise indicated. Using a fluxmeter of the type designed for a Vibrating Sample Magnetometer (Model VSM-III produced by Toei Kogyo Co., Ltd.), the coercive forces of the samples were measured in an external magnetic field of 5 KOe.

The results are shown as Curve A of accompanying FIG. 1 which is a graphic representation showing the relationship between the reaction time in min. as the abscissa and the coercive force in oersteds as the ordinate.

COMPARATIVE EXAMPLE I

The same reaction as in Example 1 was performed except that the oxidizing agent was not used. Sampling was performed every 30 min. in the same way as in Example 1, and the coercive forces of the samples were measured.

The results are shown as Curve B of FIG. 1.

COMPARATIVE EXAMPLE 2

400 g of the same Berthollide iron oxide as was used in Example 1 was dispersed in 4 liters of an aqueous solution of sodium hydroxide (1 mole/liter).

With continued stirring, a solution of 40 g of cobalt sulfate ($CoSO_4 \cdot 7H_2O$) in 500 ml of water was added to the resulting suspension. Then, a solution of 10 g of ammonium nitrate as an oxidizing agent in 200 ml of water was added, and the mixture was heated to 95° C and maintained at this temperature for 3 hours. Sampling was performed in the same way as in Example 1, and the coercive forces of the samples were measured. The results are shown in Curve C of FIG. 1.

It was confirmed by the results shown in FIG. 1 that ferromagnetic iron oxide having incorporated therein $Co^{+2}$ ions and Fe ions using an oxidizing agent (Curve A) has a higher coercive force than those obtained in the absence of an oxidizing agent (Curve B) and in the absence of Fe ions (Curve C).

EXAMPLE 2

400 g of the same Berthollide iron oxide as was used in Example 1 was dispersed in 4 liters of an aqueous solution of sodium hydroxide (1 mole/liter). With continued stirring, a solution of 40 g of cobalt sulfate ($CoSO_4 \cdot 7H_2O$) and ferrous sulfate weighed to an amount such that the $Fe/Co^{+2}$ ratio was as shown in Table 1 below, in 500 ml of water was added to the resulting suspension. Then, a solution of 10 g of sodium nitrate ($Na_2NO_3$) as an oxidizing agent in 200 ml of water was added, and the mixture was heated to 95° C and maintained at this temperature for 3 hours. The resulting magnetic powder was washed with water, filtered, and dried at 60° C. The coercive forces of five samples were measured in the same way as in Example 1, and the results are shown in Table 1.

Table 1

| Sample No. | Fe ion/$Co^{+2}$ atomic ratio | Coercive force Hc (Oe) |
|---|---|---|
| 2-1 | Fe not added | 593 |
| 2-2 | 0.25 | 597 |
| 2-3 | 0.5 | 600 |
| 2-4 | 1.0 | 589 |
| 2-5 | 1.5 | 586 |

EXAMPLE 3

400 g of the same Berthollide iron oxide as was used in Example 1 was dispersed in 4 liters of an aqueous solution of sodium hydroxide (1 mole/lter). With stirring, a solution of 40 g of cobalt sulfate ($CoSO_4 \cdot 7H_2O$) and 20 g of ferrous sulfate in 500 ml of water was added to the suspension. The mixture was heated to 95° C. When the temperature reached 95° C, air was introduced into the reaction mixture at a rate of 5 liters/min. and the reaction was carried out for 3 hours at from 95° C to the boiling point. The resulting magnetic powder, was washed with water, filtered, and dried at 60° C. The ferromagnetic iron oxide obtained had a coercive force of 615 Oe.

When the above procedure was repeated except that air was not introduced, the resulting ferromagnetic iron oxide had a coercive force of 557 Oe.

The above results demonstrate that a Co- and Fe-containing ferromagnetic iron oxide having a higher coercive force can be obtained using an oxidizing agent, and that the process of the present invention is very effective.

While the invention has been described in detail and with reference to specific embodiments thereof, it will be apparent to one skilled in the art that various changes and modifications can be made therein without departing from the spirit and scope thereof.

What is claimed is:

1. A process for producing a Co- and Fe-containing ferromagnetic iron oxide powder which comprises adding to a suspension of an acicular ferromagnetic iron oxide an oxidizing agent, an aqueous alkali solution, an aqueous solution containing $Co^{+2}$ ions and an aqueous solution of Fe ions and heat treating the resultant mixture, at a temperature of at least about 80° C said $CO^{+2}$ ions being present in said aqueous solution containing $Co^{+2}$ ions in an amount of 0.5 to 10 atomic percent based on the amount of iron present in the acicular ferromagnetic iron oxide, said Fe ions being added to the suspension in an amount of at least 0.1 equivalent but not more than 1 equivalent based on the $Co^{+2}$ ions, said aqueous alkali solution containing an amount of alkali such that after neutralizing the $Co^{+2}$ ions and the Fe ions, the hydroxyl ion concentration is at least 0.5 mol/liter; and the amount of oxidizing agent, when it is a gas, is at least 0.1 liter/min per liter of the suspension and when it is a liquid or solid, the amount is at least 0.1 equivalent based on the $Co^{+2}$ ions.

2. The process of claim 1 wherein said ferromagnetic iron oxide is maghemite, magnetite, a Berthollide iron oxide of the formula $FeO_x$ in which $1.33 < x < 1.50$, or partially oxidized metallic iron.

3. The process of claim 1 wherein the Fe ions are provided by adding a water-soluble ferrous or ferric salt.

4. The process of claim 3 wherein said ferrous salt is ferrous chloride, ferrous perchlorate, ferrous bromide, ferrous nitrate, ferrous iodide, ferrous sulfate or ferrous ammonium sulfate and said ferric salt is ferric chloride, ferric perchlorate, ferric bromide, ferric nitrate, ferric iodide, ferric sulfate, or ferric ammonium sulfate.

5. The process of claim 1 wherein the heat-treating is carried out at a temperature of 90° to 105° C.

6. The process of claim 1 wherein said oxidizing agent is selected from the group consisting of air, oxygen, hydrogen peroxide, nitrate ions, nitrite ions, chlorate ions, perchlorate ions, permanganate ions and chromate ions.

7. The process of claim 1 wherein the amount of the oxidizing agent is 0.1 to 10 liters/min.

8. The process of claim 1 wherein the amount of the oxidizing agent is 0.1 to 5 equivalents.

9. The process of claim 1 wherein the amount of the oxidizing agent is 0.5 to 2 equivalents.

10. The process of claim 1 wherein said aqueous solution containing $Co^{+2}$ ions is an aqueous solution of a water-soluble cobalt salt or an aqueous solution containing divalent cobalt hydroxide.

11. The process of claim 10 wherein said water-soluble cobalt salt is an inorganic halide, an inorganic acid salt, an organic acid salt or a complex salt of cobalt.

12. The process of claim 1 wherein the amount of the $Co^{+2}$ is 0.8 to 5 atomic percent.

13. The process of claim 1 wherein said alkali is an alkali hydroxide, an alkali carbonate, ammonia water, an aliphatic or aromatic amine, or mixtures thereof.

14. The process of claim 1 wherein an aqueous solution containing the Fe ions is added after the aqueous solution of $Co^{+2}$ ions and the aqueous alkali solution have been added.

15. The process of claim 1 wherein the aqueous solution is divided into two equal portions, and one portion is added before adding the Fe ion solution and the other portion is added after adding the Fe ion solution.

16. The process of claim 15, wherein the oxidizing agent is added after adding the aqueous alkali solution and the solution containing the $Co^{+2}$ ions and the solution containing the Fe ions.

17. The process of claim 1, wherein the oxidizing agent is added before the temperature is raised to the heat treating temperature.

18. The process of claim 1, wherein the aqueous alkali solution is added after the aqueous solution containing the $Co^{+2}$ ions is added.

19. The process of claim 1, wherein the aqueous solution containing the $Co^{+2}$ ions is added after the aqueous alkali solution is added.

20. The process of claim 1, wherein the heat-treating is carried out in the boiling state.

21. The process of claim 1, wherein the cobalt present in the Co- and Fe-containing ferromagnetic powder is not in the form of cobalt ferrite.

* * * * *